(12) United States Patent
Schneider et al.

(10) Patent No.: US 7,754,776 B2
(45) Date of Patent: Jul. 13, 2010

(54) HIGHLY CONCENTRATED OIL-IN-WATER SILICONE EMULSIONS

(75) Inventors: Otto Schneider, Burghausen (DE); Thomas Hohberg, Burghausen (DE)

(73) Assignee: Wacker Chemie AG, Munich (DE)

( * ) Notice: Subject to any disclaimer, the term of this patent is extended or adjusted under 35 U.S.C. 154(b) by 1460 days.

(21) Appl. No.: 10/534,652

(22) PCT Filed: Nov. 6, 2003

(86) PCT No.: PCT/EP03/12430

§ 371 (c)(1), (2), (4) Date: May 12, 2005

(87) PCT Pub. No.: WO2004/044036

PCT Pub. Date: May 27, 2004

(65) Prior Publication Data

US 2006/0057089 A1    Mar. 16, 2006

(30) Foreign Application Priority Data

Nov. 14, 2002 (DE) ............................. 102 53 044

(51) Int. Cl.
*C08G 77/452* (2006.01)
*C08F 283/12* (2006.01)

(52) U.S. Cl. .................. 516/55; 514/938; 524/838; 524/801

(58) Field of Classification Search ............. 524/430, 524/838, 801; 516/55; 514/937, 938
See application file for complete search history.

(56) References Cited

U.S. PATENT DOCUMENTS

| 4,182,682 | A |   | 1/1980  | Koerner et al. |         |
|-----------|---|---|---------|----------------|---------|
| 5,000,861 | A |   | 3/1991  | Yang           |         |
| 5,336,715 | A | * | 8/1994  | Sejpka et al.  | 524/765 |
| 5,852,110 | A |   | 12/1998 | Gee            |         |
| 6,294,608 | B1|   | 9/2001  | Hager et al.   |         |
| 6,409,934 | B1|   | 6/2002  | Naganawa et al.|         |
| 6,437,008 | B1|   | 8/2002  | Ikeda et al.   |         |

* cited by examiner

*Primary Examiner*—Gina C Yu
(74) *Attorney, Agent, or Firm*—Brooks Kushman P.C.

(57) ABSTRACT

Highly concentrated oil-in-water aqueous emulsions of nitrogen-containing organopolysiloxanes are prepared by dispersing the organopolysiloxanes in water without substantial addition of acid, to form a flowable, dilutable, storage stable emulsion containing 45 weight percent or more organopolysiloxane and a pH of at least 7.5.

17 Claims, No Drawings

HIGHLY CONCENTRATED OIL-IN-WATER SILICONE EMULSIONS

CROSS-REFERENCE TO RELATED APPLICATION

This application claims priority to PCT Appln. No. PCT/US03/012430 filed Nov. 6, 2003, and to German application 102 53 044.0 filed Nov. 14, 2002.

BACKGROUND OF THE INVENTION

1. Field of the Invention

The invention relates to highly concentrated oil-in-water emulsions of Si-, O-, C- and H-containing organopolysiloxanes which furthermore contain the elements N and/or S, having a pH of at least 7.5, and a process for the preparation of emulsions having a narrow particle size distribution.

2. Description of the Related Art

Silicone emulsions have been prepared and traded for decades in large quantities.

Emulsions are disperse systems of two or more liquids immiscible with one another. Known classes of emulsions are the microemulsions and macroemulsions, a distinction also being made between oil-in-water and water-in-oil emulsions.

In accordance with the prior art, water-immiscible substances, e.g. silicone oils, together with one or more emulsifiers, are stably dispersed into small droplets in water. A preservative and further additives are optionally added to the emulsion.

Highly concentrated emulsions, i.e. emulsions which contain more than 40% of siloxane, are often water-in-oil emulsions (W/O-emulsions). These W/O-emulsions are, however, not water-dilutable and therefore not suitable for industrial applications. Highly concentrated oil-in-water emulsions which can be immediately further diluted with water are desirable.

It is known that, particularly in the case of amino-functional siloxane emulsions, addition of acid or partial conversion of the amino groups into ammonium ions, considerably improves the stability of the emulsion or, in the case of many emulsions, is absolutely essential for obtaining a shelf life sufficient for sale. This applies in particular when relatively high temperatures in the range of 35-50° C. may occur during storage. Furthermore, the pH of the emulsion is also important for problem-free use. The known aminosiloxane emulsions become unstable at a pH >7 and silicone oil separates, which leads to undesired silicone spots on textiles treated with such emulsions. This is disclosed, for example, in DE 196 52 524 A1 and DE 100 04 321 A1.

A consequence of this is evident not least from the fact that, in the case of virtually all siloxane emulsions sold on the market, at least some of the amino groups present have been converted with acid into ammonium groups.

For example, EP 417 047 A, EP 459 821 and EP 404 027 describe microemulsions or macroemulsions of aminosiloxanes, wherein acid, and optionally further stabilizing additives are always employed. Furthermore, emulsions of aminosiloxane are known wherein the aminosiloxane is present partly in salt form, an indirect indication of the concomitant use of acid. Aminosiloxanes which have been partly converted into salt form are described, for example, in DE 4 004 946, it being clearly evident from the working examples that acid is used.

Emulsions of nitrogen-containing siloxanes which are prepared without acid but with a low siloxane content in the emulsion are described, for example, in DE 3 842 471; this is an amidosiloxane microemulsion having a siloxane content of 15%.

Although reduced transportation and storage costs argue in favor of the use of emulsions which are as concentrated as possible, the solids content of siloxane macroemulsions sold on the market is typically substantially less than 50%. This is due to the fact that although more highly concentrated siloxane emulsions can be prepared using existing techniques, they have such a high viscosity or typically exhibit such an increase in the viscosity during storage that they are not suitable for the majority of applications, which require good flowability and easy dilutability without complicated technical aids.

That highly concentrated emulsions are often very highly viscous and are therefore virtually impossible to handle is disclosed in DE 198 35 227 A1.

It is therefore of interest to prepare highly concentrated, low viscosity emulsions without the use of additives. Furthermore, it is of particular interest to provide highly concentrated, low-viscosity, stable emulsions which contain only a small proportion of emulsifier.

SUMMARY OF THE INVENTION

Highly concentrated organopolysiloxane emulsions of low viscosity may be prepared by emulsifying organopolysiloxanes bearing nitrogen-containing radicals in the presence of an emulsifier to form an emulsion having a pH greater than 7.5. The concentrated emulsions may be diluted with water using no or only modest agitation to form secondary emulsions having a highly unexpected uniform particle size.

DETAILED DESCRIPTION OF THE PREFERRED EMBODIMENT(S)

The invention thus pertains to highly concentrated oil-in-water emulsions of organopolysiloxanes, which contain (A) at least 45% by weight of organopolysiloxane(s) which, in addition to the elements Si, O, C and H, also contains elements which are selected from N and S,
(B) emulsifier, and
(C) water, the highly concentrated emulsions having a pH of at least 7.5 and a viscosity at 25° C. of not more than 50,000 mPa·s.

The emulsions according to the invention are distinguished by the following properties: in spite of the high siloxane content, they are readily flowable and have a relatively low viscosity; are readily dilutable with water and then form stable secondary emulsions; and have a long shelf life both in concentrated and in dilute form. Emulsions whose viscosity at 25° C. is not more than 50,000, in particular not more than 30,000 and preferably not more than 15,000 mPa·s are defined as being readily flowable.

The pH of the prepared emulsion is at least 7.5 and preferably at least 8. The emulsions according to the invention preferably have a narrow particle size distribution. The mean particle sizes are preferably in the range from 10 to 500 nm, in particular from 10 to 300 nm. These emulsions are preferably prepared using the conventional emulsification apparatuses (e.g. colloid mill, high-speed stirrer/dissolver, rotor/stator dispersing machines, ultrasonic apparatuses and high-pressure homogenizers) in a continuous or batch procedure. In one preferred embodiment, batch preparation takes place in a stirred vessel which has, as a shear tool, a rotor-stator homogenizer contained in the vessel (e.g. type UMA 9/50 from IKA-Werke, D-79219 Staufen), or outside the stirred vessel in a pumped circulation line (e.g. DISHO S-160-85 from Koruma, D-79359 Neuenburg). An additional feed pump for increasing the pressure, optionally with pressure regulation, and for transporting highly viscous intermediates or end products can optionally be installed in the pumped circulation line.

The emulsions according to the invention have a shelf life comparable with that of known siloxane emulsions in which, for example, typically 50% of the amino groups present in the form of aminoethylaminopropyl radicals are present in the silicone in a form protonated by acid, but have a substantially lower viscosity in combination with improved solubility. A further advantage is that dilutions prepared therefrom and having, for example, a solids content of 10% are stable even after storage for 2 weeks at 50° C. Acetic acid-containing emulsion concentrates not according to the invention become firm and therefore unusable under these storage conditions.

Furthermore, the stability of the dilutions prepared from emulsions according to the invention and diluted without shearing or with only slight shearing is higher than that of the emulsions diluted directly in the emulsion preparation to the solids content of the end product. This also applies at elevated temperature, for example in the range of 35-50° C. It was also surprisingly found that emulsions according to the invention which are diluted without shearing or only with slight shearing, in particular only by shaking or by means of a low-speed stirrer, have, after dilution, a particle size distribution which is narrower than that of those emulsions diluted directly in the emulsion preparation to the solids content of the end product.

The invention also relates to a process for the preparation of emulsions having a narrow particle size distribution, in which highly concentrated emulsions according to the invention are diluted without shearing or with only slight shearing. The shearing is preferably not more than 100·1/sec, in particular not more than 50·1/sec.

Preferably not more than 20%, particularly preferably not more than 10%, in particular not more than 5%, of the groups which contain elements N and/or S are protonated in the emulsions according to the invention. In particular, no protonated groups which contain elements N and/or S are present.

Organopolysiloxane(s) (A) are preferably liquid at 25° C., and preferably have viscosities of from 0.5 to 500,000 mPa·s, in particular from 2 to 80,000 mPa·s, and are preferably composed of units of the general formula I $$R_a Y_b Si(OR^1)_c O_{\frac{4-(a+b+c)}{2}}, \quad (I)$$

in which

R is a hydrogen atom or a monovalent organic radical which contains elements which are selected from O, C and H, $R^1$ is a hydrogen atom, an alkyl radical or an alkoxyalkyl radical, Y is a monovalent, SiC-bonded radical which contains elements which are selected from O, C and H and additionally contains elements which are selected from N and S, a is 0, 1, 2 or 3, b is 0, 1 or 2 and c is 0, 1, 2 or 3, with the proviso that the sum of a, b and c in the units of the general formula (I) is less than or equal to 3 and at least one radical Y is contained per molecule.

Radical R is preferably a monovalent hydrocarbon radical having 1 to 18 carbon atom(s).

Examples of radicals R are alkyl radicals, such as the methyl, ethyl, n-propyl, isopropyl, n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical and isooctyl radical, such as the 2,2,4-trimethylpentyl radical, nonyl radicals, such as the n-nonyl radical, decyl radicals, such as the n-decyl radical, dodecyl radicals, such as the n-dodecyl radical, octadecyl radicals, such as the n-octadecyl radical; alkenyl radicals, such as the vinyl and the allyl radical, cycloalkyl radicals, such as cyclopentyl, cyclohexyl and cycloheptyl radicals and methylcyclohexyl radicals, aryl radicals, such as the phenyl, naphthyl, anthryl and phenanthryl radical; alkaryl radicals, such as o-, m- and p-tolyl radicals, xylyl radicals and ethylphenyl radicals; aralkyl radicals, such as the benzyl radical and the α- and the β-phenylethyl radical, the methyl radical, ethyl radical, n-propyl radical, isopropyl radical and n-butyl radical being preferred and the methyl radical being particularly preferred.

Radical $R^1$ is preferably an alkyl radical having 1 to 4 carbon atom(s). Examples of alkyl radicals $R^1$ are the methyl, ethyl, n-propyl, isopropyl, n-butyl, isobutyl and tert-butyl radical, the methyl and ethyl radical being preferred.

Examples of alkoxyalkyl radicals are the methoxyethyl and the ethoxyethyl radical.

Preferred examples of the radicals Y are those of the general formula II $$R^2{}_2 NR^3(-NR^2-R^3)_x-\quad (II),$$

in which x is 0 or an integer from 1 to 10, $R^2$ is hydrogen, an alkyl radical, a cycloalkyl radical or a radical of the formulae —C(=O)—R or —CH$_2$—CH$_2$—C(=O)—O—R and $R^3$ is a divalent hydrocarbon radical having 1 to 12 carbon atoms per radical and R has the meaning mentioned above therefor.

The examples of alkyl and cycloalkyl radical R are also applicable in their entirety to alkyl or cycloalkyl radicals $R^2$.

Preferably at least one hydrogen atom is bonded to each nitrogen atom in the radicals of the general formula (II).

Examples of radicals $R^3$ are the methylene, ethylene, propylene, butylene, cyclohexylene, octadecylene, phenylene and butenylene radical, the n-propylene radical being preferred, particularly owing to the easy accessibility.

Examples of radicals Y are:

H$_2$N(CH$_2$)$_3$—
H$_2$N(CH$_2$)$_2$NH(CH$_2$)$_3$—
H$_2$N(CH$_2$)$_2$—
H$_3$CNH(CH$_2$)$_3$—
H$_2$N(CH$_2$)$_4$—
H$_2$N(CH$_2$)$_5$—
H(NHCH$_2$CH$_2$)$_3$—
C$_4$H$_9$NH(CH$_2$)$_2$NH(CH$_2$)$_2$— and
cyclo-C$_6$H$_{11}$NH(CH$_2$)$_3$—,
H$_2$N(CH$_2$)$_2$NH(CH$_2$)$_3$— being particularly preferred.

Preferred examples of the radicals Y are also those of the general formula III $$R^2-S^3-\quad (III)$$

in which

R² and R³ have the meanings mentioned above therefor.

The average value of a is preferably from 1.66 to 1.99, particularly preferably from 1.40 to 1.96. The average value of b is preferably from 0.01 to 0.25, particularly preferably from 0.02 to 0.17. The average value of c is preferably from 0 to 0.63, particularly preferably from 0 to 0.45.

The organopolysiloxanes (A) have elements which are selected from N and S, preferably in amounts of from 0.01 to 8% by weight, preferably from 0.1 to 2.8% by weight, particularly preferably from 0.2 to 2.1% by weight, based in each case on the total weight of the organopolysiloxane (A).

Preferred organopolysiloxanes (A) are those of the general formula IV

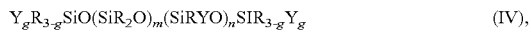

$$Y_gR_{3-g}SiO(SiR_2O)_m(SiRYO)_nSiR_{3-g}Y_g \qquad (IV),$$

in which g is 0, 1 or 2, m is 0 or an integer from 1 to 1000 and n is 0 or an integer from 1 to 500 and R and Y have the meanings mentioned above therefor, with the proviso that at least one radical Y is contained per molecule and the m units (SiR₂O) and n units (SIRYO) may be distributed as desired in the molecule.

The organopolysiloxanes (A) comprising units of the formula (I) are particularly preferably substantially linear organopolysiloxanes having a ratio of diorganosiloxane units (SiR₂O) to diorganosiloxy units (SiRYO) of, preferably, from 1000:1 to 2:1, particularly preferably from 500:1 to 10:1, in particular from 300:1 to 15:1.

The component (B) of the emulsions according to the invention preferably comprises commercially obtainable and well known emulsifiers, such as, for example, sorbitan esters of fatty acids having 10 to 22 carbon atoms; polyoxyethylene sorbitan esters of fatty acids having 10 to 22 carbon atoms and an ethylene oxide content of up to 35 percent; polyoxyethylene sorbitol esters of fatty acids having 10 to 22 carbon atoms; polyoxyethylene derivatives of phenols having 6 to 20 carbon atoms on the aromatic and an ethylene oxide content of up to 95 percent; fatty amino- and amidobetaines having 10 to 22 carbon atoms; polyoxyethylene condensates of fatty acids or fatty alcohols having 8 to 22 carbon atoms and an ethylene oxide content of up to 95 percent; ionic emulsifiers, such as alkylarylsulfonates having 6 to 20 carbon atoms in the alkyl group; fatty acid soaps having 8 to 22 carbon atoms; fatty sulfates having 8 to 22 carbon atoms; alkanesulfonates having 10 to 22 carbon atoms; alkali metal salts of dialkylsulfosuccinates; fatty amine oxides having 10 to 22 carbon atoms; fatty imidazolines having 6 to 20 carbon atoms; fatty amidosulfobetaines having 10 to 22 carbon atoms; quaternary emulsifiers, such as fatty ammonium compounds having 10 to 22 carbon atoms; fatty morpholine oxides having 10 to 22 carbon atoms; alkali metal salts of carboxylated, ethoxylated alcohols having 10 to 22 carbon atoms and an ethylene oxide content of up to 95 percent; ethylene oxide condensates of fatty acid monoesters of glycerol having 10 to 22 carbon atoms and an ethylene oxide content of up to 95 percent; mono- or diethanolamides of fatty acids having 10 to 22 carbon atoms; alkoxylated silicone emulsifiers having ethylene oxide and/or propylene oxide units; and phosphate esters.

As is well known in the area of emulsifiers, the counterions in the case of anionic emulsifiers may be alkali metals, ammonia or substituted amines, such as trimethylamine or triethanolamine. Usually, ammonium, sodium and potassium ions are preferred. In the case of cationic emulsifiers, the counterion is preferably a halide, sulfate or methylsulfate. Chlorides are the compounds which are most available industrially.

The abovementioned fatty structures are usually the lipophilic half of the emulsifiers. A conventional fatty group is an alkyl group of natural or synthetic origin. Known unsaturated groups are the oleyl, linoleyl, decenyl, hexadecenyl and dodecenyl radicals. Alkyl groups may be cyclic, linear or branched. Other possible emulsifiers are sorbitol monolaurate/ethylene oxide condensates; sorbitol monomyristate/ethylene oxide condensates; sorbitol monostearate/ethylene oxide condensates; dodecylphenol/ethylene oxide condensates; myristylphenol/ethylene oxide condensates; octylphenol/ethylene oxide condensates; stearylphenol/ethylene oxide condensates; lauryl alcohol/ethylene oxide condensates; stearyl alcohol/ethylene oxide condensates; decylaminobetaine; cocoamidosulfobetaine; oleylamidobetaine; cocoimidazoline; cocosulfoimidazoline; cetylimidazoline; 1-hydroxyethyl-2-heptadecenylimidazoline; n-cocomorpholine oxide; decyldimethylamine oxide; cocoamidodimethylamine oxide; sorbitan tristearate having condensed ethylene oxide groups; sorbitan trioleate having condensed ethylene oxide groups; sodium or potassium dodecylsulfate; sodium or potassium stearylsulfate; sodium or potassium dodecylbenzenesulfonate; sodium or potassium stearylsulfonate; triethanolamine salt of dodecyl sulfate; trimethyldodecylammonium chloride; trimethylstearylammonium methosulfate; sodium laurate; and sodium or potassium myristate.

The nonionic emulsifiers are preferred. The component (B) may consist of an abovementioned emulsifier or of a mixture of two or more abovementioned emulsifiers.

The emulsions according to the invention contain emulsifier (B) in amounts of, preferably, from 1 to 60% by weight, particularly preferably from 5 to 30% by weight, based in each case on the total weight of organopolysiloxane (A).

The emulsions according to the invention may also contain further organosilicon compounds as a component (D). Examples of organosilicon compounds (D) are silanes, silicone oils which contain no elements N and S, and silicone resins.

Examples of silanes (D) are vinyltris(methoxyethoxy)silane, tetraethoxysilane, methyltriethoxysilane, anhydrolyzed methyltriethoxysilane, aminoethylaminopropyltrimethoxysilane, aminoethylaminopropyl(methyl)dimethoxysilane.

Suitable silicone oils (D) are all liquid silicones which contain no element N and which are substituted or unsubstituted and have viscosities of from 0.5 to 500,000 mPa·s, in particular from 0.5 to 80,000 mPa·s, at 25° C.

Furthermore, silicone resins (D), such as, for example, methylsilicone resins or methyl-/dimethylsilicone resins or phenylsilicone resins, may also be emulsified. Furthermore, mixtures of these 3 abovementioned organosilicon compounds (D) are possible, which are then emulsified as a mixture in different compositions.

The emulsions according to the invention contain organosilicon compounds (D) in amounts of, preferably, from 0 to 75% by weight, particularly preferably from 0 to 40% by weight, very particularly preferably from 0 to 10% by weight, based in each case on the total weight of organopolysiloxane (A).

The emulsions according to the invention are present in water-dilutable form. The emulsions according to the invention are typically used in dilute form, for example mixed with other aqueous products, and/or they are used after dilution with water.

Moreover, the emulsions according to the invention can be used for all applications in which organopolysiloxanes (A) in water-emulsified form were also used to date.

All above symbols of the above formulae have their meanings in each case independently of one another. In all formulae, the silicon atom is tetravalent.

In the following examples, unless stated otherwise in each case, all stated amounts and percentages are based on weight, all temperatures are 20° C. and all pressures are 1013 hPa (abs.). All viscosities are determined at 25° C.

EXAMPLES

The raw materials mentioned in table 1 are used in the examples:

TABLE 1

| Raw material | Description |
|---|---|
| AK 350 | Polydimethylsiloxane oil having trimethylsilyl terminal groups, viscosity at 25° C., 350 mm²/s. |
| Amine oil 1 | Polydimethylsiloxane oil having aminoethylaminopropyl side groups. Viscosity: 4000 mPa.s; amine number: 0.14 |
| AP 500 | Polydimethylsiloxane oil having trimethylsilyl terminal groups, partly phenyl-substituted in the chain. Viscosity: 500 mPa.s |
| Amine oil 2 | Polydimethylsiloxane oil having about 130 dimethylsilyloxy units. Terminal groups: Aminopropyldimethylsilyloxy. All silicone products described above are available from Wacker-Chemie GmbH. |
| DM water | Demineralized water |
| IT 10/80 | Isotridecyl alcohol polyethylene glycol ether (10 ethylene oxide units), 80% strength in water. Lutensol ® TO 108 from BASF AG. |
| IT 5 | Isotridecyl alcohol polyethylene glycol ether (5 ethylene oxide units). Lutensol ® TO 5 from BASF AG. |

The O/W emulsions X 610, H 601/1 and K 793 according to the invention are prepared by mixing the raw materials of table 1, apparatuses according to the prior art (e.g. high-speed dissolver) being used. The preparation involves a so-called stiff phase.

Examples X 608, H 601/2 and VS 204 are not according to the invention.

Particle size distribution: On the basis of examples X 610 and K 793, it is demonstrated that the dilute emulsion prepared according to the invention has a narrower particle size distribution than the dilutions prepared with shearing, for example from X 610 (total solids content 39.9%) or the dilution from K 793 (silicone content 35.0%).

Shelf life: K 793 has a low viscosity. If acetic acid is added (table 5), the viscosity of the emulsion increases immediately. K 793 still has a low viscosity after storage for 2 weeks at 50° C., while VS 204/4 (not according to the invention, contains 0.5 mol of acetic acid per mole of amine), which is highly viscous after preparation, is firm and therefore unusable

TABLE 2

Formulations X 608 and X 610:

| Starting materials | X 608 (Comp.) Amount [g] | % | X 610 Amount [g] | % |
|---|---|---|---|---|
| IT 10/80 | 35.00 | 5.0 | 35.00 | 5.7 |
| IT 5 | 20.00 | 2.8 | 20.00 | 3.3 |
| Amine oil 1 | 354.00 | 50.2 | 354.00 | 57.9 |
| DM water | 294.00 | 41.7 | 202.00 | 33.1 |
| Acetic acid, 80% | 1.70 | 0.2 | 0.00 | 0.0 |
| Total | 704.70 | 100.0 | 611.00 | 100 |

TABLE 3

| Result | X 608 (Comp.) | X 608 dilute | X 610 | X 610 dilute |
|---|---|---|---|---|
| Solids content in % | 56.6 | 38.0 | 67.09 | 39.9 |
| Particle size in nm | 148 | 170 | 209 | 228 |
| Particle size distribution | narrow | broad | narrow | broad |
| Viscosity in mPa · s (25° C.); Brookfield Spindle 2, 2.5 1/min | firm | — | 1230 | — |
| pH | 6.0 | — | 8.5 | — |

The highly concentrated emulsions were diluted in a dissolver with shearing to give dilute emulsions.

TABLE 4

Formulation K 793:

| Starting materials | Amount [g] | % |
|---|---|---|
| TT 10/80 | 5.40 | 9.0 |
| Amine oil 1 | 33.00 | 55.0 |
| DM water | 21.50 | 35.8 |
| Preservative CB | 0.12 | 0.2 |
|  |  | 0.0 |
| Total | 60.02 | 100.0 |

TABLE 5

Formulation VS 204 (Comparative) (prepared from K 793 with addition of acetic acid) and results:

| Experiment number | Amounts of K 793 + acetic acid Amount [g] | Viscosity (25° C.) Brookfield Spindle 2; 2.5 1/min (mPa · s) | Particle size (nm) |
|---|---|---|---|
| K 793 | 450 + 0 | 1400 | 205 |
| VS 204/2 | 450 + 0.12 | 10.625 | 202 |
| VS 204/3 | 450 + 0.58 | 21.250 | 184 |
| VS 204/4 | 450 + 1.16 | 21.750 | 138 |

TABLE 6

Formulations H 601/1 and H 601/2:

| Starting materials | H 601/1 Amount [g] | % | H 601/2 (Comp.) Amount [g] | % |
|---|---|---|---|---|
| IT 10/80 | 54.00 | 8.7 | 54.00 | 8.7 |
| Amine oil 2 | 330.00 | 53.2 | 330.00 | 53.2 |
| DM water | 236.00 | 38.1 | 232.00 | 37.4 |
| Acetic acid, 80% | 0.00 | 0.0 | 4.00 | 0.6 |
| Total | 620.00 | 100.0 | 620.00 | 100.0 |

TABLE 7

Results for H 601/1 and H 601/2:

| Result | H 601/1 (without acetic acid) | H 601/1 (with acetic acid) | H 601/2 acetic acid |
|---|---|---|---|
| Solids content in % | | 60.2 | 60.2 |
| Particle size in nm | | 172 | 147 |
| Viscosity at 25° C. in mPa · s (Brookfield, spindle 2) | | 1100 | 76.500 |
| pH | | 9.0 | 4.5 |

The invention claimed is:

1. A highly concentrated oil-in-water emulsion of organopolysiloxanes, which contains
   (A) at least 45% by weight of at least one organopolysiloxane which, in addition to the elements Si, O, C and H, also contains at least one amino group-containing radical Y of the formula II $$R^2{}_2NR^3(-NR^2-R^3)_x-$$ (II), in which
   x is 0 or an integer from 1 to 10,
   $R^2$ is hydrogen, an alkyl radical, a cycloalkyl radical, or a radical of the formulae $-C(=O)-R$ or $-CH_2-CH_2-C(=O)-O-R$, and
   $R^3$ is a divalent hydrocarbon radical having 1 to 12 carbon atoms per radical,
   (B) at least one emulsifier, and
   (C) water,
   the highly concentrated emulsion having a pH of at least 7.5 and a viscosity at 25° C. of not more than 50,000 mPa·s.

2. The emulsion of claim 1, wherein at least one organopolysiloxane (A) comprises units of the formula I $$R_a Y_b Si(OR^1)_c O_{\frac{4-(a+b+c)}{2}},$$ (I)

in which
R is hydrogen or a monovalent organic radical containing at least one of O, C, or H,
$R^1$ is hydrogen, an alkyl radical, or an alkoxyalkyl radical,
a is 0, 1, 2 or 3,
b is 0, 1 or 2, and
c is 0, 1, 2 or 3,
with the proviso that the sum of a, b and c in the units of the formula (I) is less than or equal to 3 and at least one radical Y is contained per molecule.

3. The emulsion of claim 2, wherein at least one radical Y is one of the formula II $$R^2{}_2NR^3(-NR^2-R^3)_x-$$ (II), in which
x is 1,
$R^2$ is hydrogen,
$R^3$ are ethyl or propyl.

4. The emulsion of claim 1, wherein the emulsifiers (B) are nonionic emulsifiers.

5. The emulsion of claim 1, which contains emulsifier (B) in amounts of from 1 to 60% by weight, based on the total weight of organopolysiloxane (A).

6. The emulsion of claim 1, which contains organosilicon compounds other than those of organopolysiloxanes (A), as component (D).

7. The emulsion as claimed in claim 1, in which the organosilicon compounds (D) are selected from the group consisting of silanes, silicone oils which do not contain N, silicone resins, and mixtures thereof.

8. A process for the preparation of aqueous emulsions of amino group-containing organopolysiloxanes, comprising diluting with no more than slight shearing, a highly concentrated oil-in-water emulsion of organopolysiloxanes of claim 1, which contain
   (A) at least 45% by weight of organopolysiloxane which, in addition to the elements Si, 0, C and H, also contains at least one amino group-containing radical Y of the formula II $$R^2{}_2NR^3(-NR^2-R^3)_x-$$ (II), in which
   x is 0 or an integer from 1 to 10,
   $R^2$ is hydrogen, an alkyl radical, a cycloalkyl radical, or a radical of the formulae $-C(=O)-R$ or $-CH_2-CH_2-C(=O)-O-R$, and
   $R^3$ is a divalent hydrocarbon radical having 1 to 12 carbon atoms per radical,
   (B) at least one emulsifier, and
   (C) water,
   the highly concentrated emulsions having a pH of at least 7.5 and a viscosity at 25° C. of not more than 50,000 mPa·s.

9. The oil in water emulsion of claim 1, wherein not more than 20 mol percent of all amino groups present are in protonated form.

10. The oil in water emulsion of claim 1, wherein not more than 10 mol percent of all amino groups present are in protonated form.

11. The oil in water emulsion of claim 1, wherein not more than 5 mol percent of all amino groups present are in protonated form.

12. The oil in water emulsion of claim 1, wherein no amino groups are in protonated form.

13. The oil in water emulsion of claim 1, where the organopolysiloxane (A) has a viscosity of from 2 to 80,000 mPas.

14. The oil in water emulsion of claim 1, which has a pH of at least 8.

15. The oil-in-water emulsion of claim 1, which has a mean particle size of from 10 nm to 500 nm.

16. The oil-in-water emulsion of claim 1, which has a mean particle size of from 10 nm to 300 nm.

17. The process of claim 8, wherein the particle size of the aqueous emulsion prepared by the process has a narrower particle size distribution than an emulsion of the same solids content prepared directly by emulsifying organopolysiloxane (A) in water.

* * * * *

UNITED STATES PATENT AND TRADEMARK OFFICE
CERTIFICATE OF CORRECTION

| | | |
|---|---|---|
| PATENT NO. | : 7,754,776 B2 | Page 1 of 1 |
| APPLICATION NO. | : 10/534652 | |
| DATED | : July 13, 2010 | |
| INVENTOR(S) | : Otto Schneider et al. | |

It is certified that error appears in the above-identified patent and that said Letters Patent is hereby corrected as shown below:

Column 10, Line 27, Claim 8:

Delete "0" (zero) and insert -- O --.

Signed and Sealed this

Fourteenth Day of September, 2010

David J. Kappos
*Director of the United States Patent and Trademark Office*